US008954308B2

(12) United States Patent
Choi et al.

(10) Patent No.: US 8,954,308 B2
(45) Date of Patent: Feb. 10, 2015

(54) MODELING OF MULTI-LAYERED POWER/GROUND PLANES USING TRIANGLE ELEMENTS

(75) Inventors: Jae Young Choi, Atlanta, GA (US); Madhavan Swaminathan, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 440 days.

(21) Appl. No.: 13/403,594

(22) Filed: Feb. 23, 2012

(65) Prior Publication Data

US 2012/0150523 A1    Jun. 14, 2012

Related U.S. Application Data

(63) Continuation-in-part of application No. 12/710,991, filed on Feb. 23, 2010, now Pat. No. 8,219,377.

(60) Provisional application No. 61/445,713, filed on Feb. 23, 2011, provisional application No. 61/154,543, filed on Feb. 23, 2009.

(51) Int. Cl.
*G06F 17/50* (2006.01)

(52) U.S. Cl.
CPC ........ *G06F 17/5036* (2013.01); *G06F 17/5018* (2013.01); *G06F 2217/40* (2013.01)
USPC .......................................................... 703/14

(58) Field of Classification Search
USPC ........................................................ 703/14
See application file for complete search history.

(56) References Cited

U.S. PATENT DOCUMENTS

| 6,188,582 | B1 | 2/2001 | Peter |
| RE41,001 | E | 11/2009 | Oshima |
| 7,895,540 | B2 | 2/2011 | Engin et al. |
| 8,219,377 | B2 * | 7/2012 | Bharath et al. .................. 703/14 |
| 8,352,232 | B2 | 1/2013 | Han et al. |
| 2008/0091389 | A1 | 4/2008 | Kim |

OTHER PUBLICATIONS

Wu et al.: "Delaunay-voronoi modeling of power-ground planes with source port correction," IEEE Trans. Adv. Packag., vol. 31, No. 2, pp. 303-310, May 2008.*

(Continued)

*Primary Examiner* — Hugh Jones
(74) *Attorney, Agent, or Firm* — Bryan W. Bockhop; Bockhop & Associates, LLC

(57) ABSTRACT

In a method of simulating electrical characteristics of a circuit board having a plurality of features, the plurality of features is projected onto a planar construct. A Delaunay triangulation routine for generating a triangular mesh that corresponds to the single planar construct is executed on the digital computer. A routine that generates a Voronoi diagram corresponding to the triangular mesh. An equivalent circuit for each triangle is determined. The equivalent circuit includes exactly three sub-circuits that couple a vertex within the triangle to a vertex within an adjacent triangle and exactly one sub-circuit that couples the vertex within the triangle to a reference plane. A routine solves, for each triangle, an equation describing an electrical characteristic value based on the equivalent circuit corresponding to the triangle. A routine for generating a human-perceptible indication of the electrical characteristic value for each triangle is executed on the digital computer.

16 Claims, 9 Drawing Sheets

(56) References Cited

OTHER PUBLICATIONS

Chun: Methodologies for Modeling Simultaneous Switching Noise in Multi-Layered Packages and Boards; PhD Thesis; 2002; School of Electrical and Computer Engineering Georgia Institute of Technology; 170 pages.*

Bharath et al., Signal and Power Integrity Co-Simulation for Multi-layered System on Package Modules; Electromagnetic Compatibility, 2007. EMC 2007. IEEE International Symp., vol., No., pp. 1-6, Jul. 9-13, 2007.*

Engin et al and inventor: Multilayered Finite-Difference Method (MFDM) for Modeling of Package and Printed Circuit Board Planes; IEEE Transactions on Electromagnetic Compatibility; 2007; pp. 441-447.*

Choi and Swaminathan (inventors): Modeling of Power/Ground Planes Using Triangular Elements; IEEE Transactions on Components, Packaging and Manufacturing Technology, vol. 4, No. 2, Feb. 2014; pp. 291-302.*

Swaminathan, Madhavan & Engin, A. Ege; "Power Integrity Modeling and Design for Semiconductors and Systems"; Nov. 29, 2007; Prentice Hall (Submitted in two separte files: the first including Chapt. 1-4; the second including Chapt. 5-Appendix B), 462 pages (total).

Applicant hereby notifies the examiner of commonly owned U.S. Appl. No. 13/224,270, filed Sep. 1, 2011, which may include subject matter related to the present application.

* cited by examiner

To obtain the reference voltage, V(N1), either of below can be used:

1) <u>Interpolate VN1 by using V1.</u>
   $V(N1)=V(1)*(d_N/(d_1+d_2+...+d_N))$.
   Also, interpolate the other terminal: $V(N2)=V(2)*(d_N/(d_1+d_2+...+d_N))$.

2) <u>Use V(N1') (the closest metal node next to N1).</u>
   $V(N1) \approx V(N1')$.
   Also, use V(1') instead of V(1).
   (node 1' is vertically aligned with N1')

MODELING OF MULTI-LAYERED POWER/GROUND PLANES USING TRIANGLE ELEMENTS

CROSS-REFERENCE TO RELATED APPLICATION(S)

This application is a continuation-in-part of and claims the benefit of U.S. patent application Ser. No. 12/710,991, filed Feb. 23, 2010, which claims the benefit of U.S. Provisional Patent Application Ser. No. 61/154,543, filed Feb. 23, 2009, the entirety of each of which is hereby incorporated herein by reference.

This application also claims the benefit of U.S. Provisional Patent Application Ser. No. 61/445,713, filed Feb. 23, 2011, the entirety of which is hereby incorporated herein by reference.

BACKGROUND OF THE INVENTION

The present invention relates to electronic device modeling systems and, more specifically, to a system for modeling ground plains used in circuit boards.

DESCRIPTION OF THE RELATED ART

A high-performance digital or mixed signal system can contain thousands of signal lines that must be routed on several layers in the package and printed circuit board (PCB). These signal layers must be placed between or over power and ground planes in order to have an impedance controlled board including microstrip or stripline transmission lines. A power or ground plane also prevents any coupling of signal lines in an upper layer to signal lines in a lower layer. As a result of this, many power and ground layers have to be included in the stack-up. In order to reduce the parasitic effects of the power delivery network (e.g., to reduce the inductance of the planes), these layers can be allocated to power and ground in an alternating manner such that multiple plane pairs can exist in a package or board.

Power and ground planes in electronic packaging can be a major factor for noise coupling. There can be noise coupling not only in the transversal direction between two planes, but also in the vertical direction from one plane pair to another through the apertures and via holes. Excessive supply voltage fluctuations cause signal integrity (SI) problems. In addition, noise voltage that gets coupled to the edge of the board may cause significant electromagnetic interference (EMI). Hence, an accurate modeling of power/ground planes is critical to estimate the noise levels especially in mixed-signal systems where high isolation levels are required.

A solid plane made of a perfect conductor of infinite lateral dimensions would completely shield the fields on one side from the other side. Therefore, there would be no need to consider multiple plane pairs. In reality, however, planes at the same dc level have to be connected with vias to each other in order to reduce the effective inductance of the planes. Such a via has to go through a via hole in a plane having a different dc level in order to avoid a short circuit. Through this via and via hole, fields in different plane pairs get coupled to each other.

In addition, planes often have irregular geometries. There can be large apertures and splits in planes. Fields in different plane pairs can get coupled through these apertures. This can be regarded as a coupling by means of a wrap-around current on the edges of the planes. For narrow slots, a transmission-line-based model has been proposed to take into account this interlayer coupling. Electric and magnetic polarization currents have also been considered to compute the coupling through electrically small cutouts.

The field penetration through the conductors can be neglected for frequencies, where the skin depth is much smaller than the plane thickness. At lower frequencies, this field penetration has to be taken into account. For purposes of the description presented below, the thickness of the metal is assumed to be much larger than the skin depth. This assumption is valid above several megahertz for commonly used copper planes in packages.

Based on the finite-difference method (FDM), two equivalent circuit models for power and ground planes have been developed: T- and X-models. The multilayered FDM (MFDM) provides a simpler approach without any limit on the number of layers. It provides an accurate representation of wrap-around currents in complicated geometries, which have not been modeled before.

The multi-layered finite-difference method (M-FDM) is a finite difference-based technique that can solve power plane problems using square-meshes. The limitation of the method is that it uses a rigid, square, grid. Typically, package PDNs are electrically large. Thus, for a large solid plane, the square mesh used by M-FDM can use a cell size that is dependent on the maximum frequency of simulation. A good rule of thumb is to use a discretization width of $\lambda/20$. However, these PDNs also contain geometrically small features such as split planes and apertures. To capture very fine structures, the regular mesh becomes dense locally and globally, resulting in a large number of unknowns.

In typical package geometries, the minimum feature size can easily be less that 100 μm or 4 mils. Thus for a 50 mm×50 mm package, the total number of cells required to model one solid plane-pair using a 100 μm cell size is 250,000. Although M-FDM has been demonstrated in its current implementation for a maximum of 1 million unknowns, this only allows for the modeling of four plane-pairs. Given that the feature size on package and board are shrinking to allow for greater wiring density, the mesh may limit M-FDM.

As more packages or chips are integrated into a single system in recent electronic designs, power/ground planes tend to contain numerous and diverse features than ever, such as via holes, small apertures, plane gaps, etc. Although dimensions of these features are usually very small compared to the power/ground planes, their influence on the power delivery network cannot be neglected. However, power/ground plane analysis methods using square or rectangular meshes, such as multilayer-finite difference method, can generate large number of unit cells for small features in a large design.

Design and analysis of power delivery network (PDN) become more challenging as more dissimilar electronic components are integrated in an electronic system. To meet the different power supply requirements of the integrated components, power/ground planes are usually stacked on each other or separated by an aperture or a gap. These apertures or gaps can provide paths for horizontal/vertical coupling of the electromagnetic energy. Furthermore, the effect of smaller discontinuities such as via anti-pads for signal routing is no longer negligible in high-speed systems. This coupled energy leads to unwanted power/ground noise, which can result in large fluctuations in supply voltage. Therefore, a modeling method that can effectively analyze the impedance of the PDN may be required.

3D Full-wave solvers can provide accurate solutions for most of the problems. However, they tend to generate too many unknowns for complex and multi-scale structures, and thus require large memory and long simulation time. Therefore, considerable research is being devoted to obtain an accurate solution for power/ground structures with efficient numerical methods.

One of the approaches, M-FDM, is based on finite difference method using square mesh. MFDM can accurately solve for multi-layer structures while generating a sparse system matrix. However, the square mesh may generate too many unknowns for small features in large designs in certain applications. Furthermore, square mesh may suffer from a staircase approximation error. Thus, a square mesh may not be suitable in all circumstances for the modeling of a typical PDN, which contains multi-scale and arbitrary geometries.

It would be desirable to have methods and software that may be used to model multilayer planes and provide equivalent circuit models for such structures in which non-uniform meshes are used to model circuit equivalents in a power or ground plane.

SUMMARY OF THE INVENTION

The disadvantages of the prior art are overcome by the present invention which, in one aspect, is a method, operable on a digital computer coupled to a user interface, of simulating electrical characteristics of a circuit board having a plurality of features. The plurality of features is projected onto a planar construct. A Delaunay triangulation routine for generating a triangular mesh that corresponds to the single planar construct is executed on the digital computer. The triangular mesh includes a plurality of triangles in which each triangle and three other triangles each share a common side. A routine that generates a Voronoi diagram corresponding to the triangular mesh in which the Voronoi diagram comprises a plurality of cells that include a plurality of edges is executed on the digital computer. Each edge ends in a vertex, wherein exactly one vertex is disposed in each triangle in the triangular mesh. An equivalent circuit for each triangle is determined. The equivalent circuit includes exactly three sub-circuits that couple a vertex within the triangle to a vertex within an adjacent triangle and exactly one sub-circuit that couples the vertex within the triangle to a reference plane. A routine for solving, for each triangle, an equation describing an electrical characteristic value based on the equivalent circuit corresponding to the triangle is executed on the digital computer. A routine for generating a human-perceptible indication of the electrical characteristic value for each triangle is executed on the digital computer.

In another aspect, the invention is a method, operable on a digital computer coupled to a user interface, of simulating electrical characteristics of a circuit board having a plurality of features. The plurality of features is projected onto a planar construct. A Delaunay triangulation routine for generating a triangular mesh that corresponds to the single planar construct is executed on the digital computer. The triangular mesh includes a plurality of triangles in which each triangle and three other triangles each share a common side. A routine is executed on the digital computer that generates a Voronoi diagram corresponding to the triangular mesh in which the Voronoi diagram comprises a plurality of cells that include a plurality of edges. Each edge ends in a vertex, wherein exactly one vertex is disposed in each triangle in the triangular mesh and wherein each edge of each cell is orthogonal to exactly one side of one a triangle. The Voronoi diagram has an increasing density of vertices in areas nearer to a feature and a decreasing density of vertices in areas farther from a feature. An equivalent circuit for each triangle is determined. The equivalent circuit includes exactly three sub-circuits that couple a vertex within the triangle to a vertex within an adjacent triangle and exactly one sub-circuit that couples the vertex within the triangle to a reference plane. The triangular mesh and the Voronoi diagram are projected onto a selected electrical plane in the circuit board. Application of a predefined current to a selected port located on the selected electrical plane is simulated. A voltage for at least one vertex on the Voronoi diagram projected onto the selected plane resulting from the predefined current is calculated. A routine for generating a human-perceptible indication of the electrical characteristic value for each triangle is executed on the digital computer.

In yet another aspect, the invention is a method, operable on a digital computer coupled to a user interface, of modeling a non-vertical port, including a first terminal and a spaced apart second terminal that is disposed in a non-vertical relationship to the first terminal, the first terminal disposed on a first conductive plane and the second terminal disposed on a selected one of the first conductive plane and a spaced apart second conductive plane, by instructing the digital computer to execute a set of commands. A command is executed to generate a simulated representation of the first conductive plane, the first terminal and the second terminal. A command is executed to generate a simulated reference plane disposed apart from a conductive plane on which the second terminal is disposed. A command is executed to calculate a first voltage difference between the first terminal and a common dummy plane. A command is executed to calculate a second voltage difference between a first virtual terminal and the common dummy plane, wherein the first virtual terminal is vertically aligned with the first terminal and is disposed on a reference plane. A command is executed to subtract the second voltage difference from the first voltage difference, thereby generating a first terminal voltage. A command is executed to calculate a third voltage difference between the second terminal and the common dummy plane. A command is executed to calculate a fourth voltage difference between a second virtual terminal and the common dummy plane, wherein the second virtual terminal is vertically aligned with the second terminal and is disposed on the reference plane. A command is executed to subtract the fourth voltage difference from the third voltage difference, thereby generating a second terminal voltage. A command is executed to subtract the second terminal voltage from the first terminal voltage, thereby determining a port voltage.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
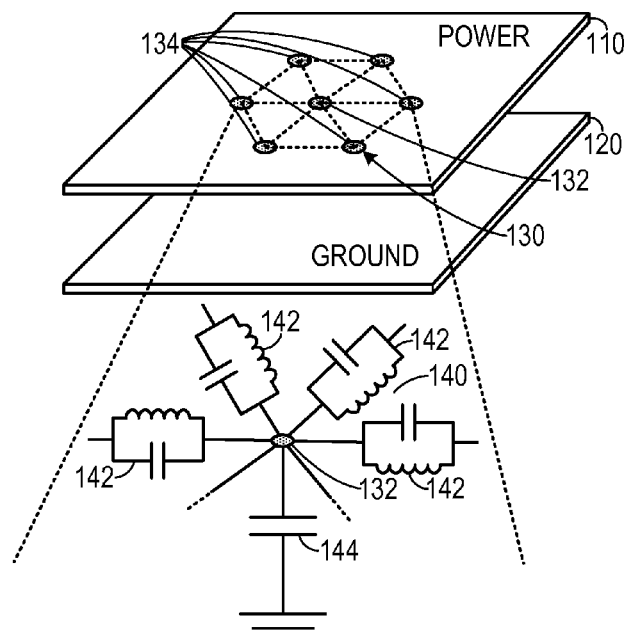
FIG. 1 is a schematic diagram showing an equivalent circuit that corresponds to a portion of a triangular mesh projected on a power plane.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 11/888,705, filed on Aug. 2, 2007 by Engin et al. discloses multilayered finite difference methods for electrical modeling of packages and printed circuit board and is, therefore, incorporated herein by reference. U.S. patent application Ser. No. 12/288,616, filed on Oct. 22, 2008 by Han et al. discloses modeling electrical interconnections in three-dimensional structures and is, therefore, incorporated herein by reference.

The present invention is directed to a multilayer finite element method (MFEM), in which a Delaunay triangular mesh is applied to each metal layer. The potential distribution on each plane-pair is expanded in terms of pyramid basis functions. On simplification, the obtained matrix equation can be shown to represent an electrical network. This development of a triangular mesh based finite element technique can be applied to multi-layer geometries. As only a surface mesh is required, this approach requires far fewer unknowns than a general 3D FEM-based solution.

Formulation for Single Plane-Pair Geometries

An efficient approximation that can be employed for package power planes is that of a planar circuit. A planar circuit is a microwave structure in which one of the three dimensions, say z, is much smaller than the wavelength. Under this condition, it can be assumed that the field is invariant along the z-direction. Hence $$\frac{\delta}{\delta z} = 0$$

and the governing equation reduces to the scalar 2D-Helmholtz wave equation:

$$(\nabla^2 + k^2)u = j\omega\mu dJ_z, \nabla^2 = \left(\frac{\delta^2}{\delta x^2} + \frac{\delta^2}{\delta y^2}\right) \quad (150)$$

where $\nabla^2$ is the transverse Laplace operator parallel to the planar structures, u is the voltage, d is the distance between the planes, k is the wave number, and $J_2$ is the current density injected normally to the planes. The open circuit at the boundary can be represented by a magnetic wall or Neumann boundary condition, which completes the problem formulation.

Using a standard finite-element approximation with a triangular mesh elements and linear pyramid or "hat" basis functions, the weak form of the PDE in Equation (150) is:

$$\sum_{j=1}^{N} \int\int_{\Omega} [\nabla\phi_j \cdot \nabla\phi_i + \omega^2\mu\varepsilon\phi_j\phi_i + j\omega\mu dJ_z\phi_i]dxdy = 0 \quad (151)$$

where $\Omega$ is the problem domain. The formulation of the matrix equation for 2D geometries is well known. For convenience, simplex coordinates {L1,L2,L3} have been used, which can be related to the Cartesian coordinates:

$$x = L_1 x_1 + L_2 x_2 + L_3 x_3 \quad (152)$$

$$y = L_1 y_1 + L_2 y_2 + L_3 y_3 \quad (153)$$

$$L_1 + L_2 + L_3 = 1 \quad (154)$$

The equations above can be solved to obtain:

$$L_i = \frac{1}{2\Delta}(a_i + b_i x + c_i y) \quad (155)$$

$$a_i = x_{i+1}y_{i+2} - x_{i+2}y_{i+1}$$

$$b_i = y_{i+1} - y_{i-1}$$

$$c_i = x_{i-1} - y_{i+1}$$

and the subscripts are evaluated (modulo 3)+1. $\Delta$ is the area of the triangle with vertices at points (P1, P2, P3). Within the cell, the pyramid basis functions are identical to the simplex coordinates themselves. Hence, Equation (151) can be rewritten in matrix form as follows:

$$(\overline{K} + \overline{M})\overline{U} = \overline{F} \quad (156)$$

where, $\overline{K}$ and $\overline{M}$ represent the stiffness and mass matrices, respectively, $\overline{U}$ is the unknown potential, and $\overline{F}$ contains the contributions from the current source excitation. The entries of $\overline{K}$, $\overline{M}$ and $\overline{F}$ are:

$$k_{i,j} = \int\int_\Omega \frac{j}{\omega\mu d}\nabla\phi_i \cdot \nabla\phi_j dxdy \tag{157}$$

$$m_{i,j} = \int\int_\Omega \frac{-j\omega\varepsilon}{d}\phi_i\phi_j dxdy \tag{158}$$

$$f_i = \int\int_\Omega J_z\phi_i dxdy \tag{159}$$

The linear pyramid basis functions are equal to the simplex coordinates within the cell, i.e.

$$\phi_i(L_1, L_2, L_3) = L_i \tag{160}$$

Therefore, $$\nabla\phi_i = \nabla L_i = \frac{1}{2\Delta}(\hat{x}b_i + \hat{y}c_i) \tag{161}$$

Substituting Equation 161 in Equation 157, $$k_{i,j} = \frac{b_ib_j + c_ic_j}{4\Delta}\frac{j}{\omega\mu d} \tag{162}$$

The evaluation of the integral to obtain $m_{i,j}$ (Equation 158) and $f_i$ (Equation 159) can be performed by transforming the coordinates from Cartesian to simplex using the Jacobian, $$dxdy = dL_1 dL_2 \frac{\delta(x,y)}{\delta(L_1,L_2)} = 2\Delta dL_1 dL_2 \tag{163}$$

The integrals in Equations 158-159 are a special case of the general formula where a; b and c are integer powers. Therefore, substituting a=2; b=0; c=0 when i=j and a=1; b=1; c=0 when i≠j, $$m_{i,j} = \frac{-j\omega\varepsilon}{d}\frac{\Delta}{12}(1+\delta_{i,j}), \tag{165}$$

where $\delta_{i,j}$ is the Kronecker delta function.

Using a=1; b=0; c=0, $$f_i = J_z\frac{\Delta}{3} \tag{166}$$

Development of an Equivalent Circuit

As shown in FIG. 1, two separate planes, such as a power plane 110 and a ground plane 120 can be modeled with a triangular mesh 130 in which a plurality of nodes 132 and 134 are connected to form triangles. An equivalent circuit element 142 including an impedance value (which can include, for example, a capacitance and an inductance) can be assigned between each node 132 and each surrounding node 134. A capacitance 144 can also be assigned between each node 132 and the ground plane.

In such a equivalent circuit 140, $\overline{K}$ and $\overline{M}$ represent the admittance matrices of frequency-independent inductive and capacitive components, respectively. Specifically, $\overline{K}$ represents inductors connected between triangle vertices (i.e., along the triangle edges), and M represents capacitors connected between triangle vertices and to ground, as shown in FIG. 1. This can be shown by evaluating one row of the 3×3 local matrix corresponding to one triangle. For example, the sum of the first row of this matrix is:

$$S = \sum_{j=1}^{3} \frac{b_1b_j + c_1c_j}{4\Delta}\frac{j}{\omega\mu d}$$

Consider the b1bj term for j=1, 2, 3.

$b_1^2 = (y_2-y_3)$ for $i=j=1$ $b_1b_2 = (y_2-y_3)(y_3-y_1)$ for $i=1, j=2$ $b_1b_3 = (y_2-y_3)(y_1-y_2)$ for $i=1, j=3$ $\therefore b_1^2 + b_1b_2 + b_1b_3 = 0 \tag{167}$ Similarly, $c_1^2 + c_1c_2 + c_1c_3 = 0 \tag{168}$ The other rows of the 3×3 local matrix also sum to zero. This implies that the rows (and by symmetry, the columns) of $\overline{K}$ sum to zero. This corresponds to circuit elements (in this case, inductances) connected between the triangle vertices, with no element to system ground. The row and column sums of $\overline{M}$ do not vanish, indicating capacitances to ground in addition to capacitive elements along edges.

Hence, the equivalent circuit for the single plane-pair case can be represented by the admittance matrix $\overline{Y}$, where $\overline{Y} = \overline{K} + \overline{M}$. This matrix is sparse and the solution to Equation (156) can be obtained using standard linear equation solvers well known to the art. The ability to obtain an equivalent circuit enables the extension of the method to multiple plane pair geometries, without the need for using 3D-mesh elements (i.e. tetrahedral or hexahedral).

Formulation for Multiple Plane-Pairs

As in the single plane-pair case, a triangular mesh is applied to each metal layer. The multi-layer formulation requires that the location of the mesh nodes be the same on every layer. This is done by flattening or collapsing the features on each metal layer on to one layer, on which triangulation is performed to obtain the mesh. The mesh thus obtained is used to discretize all layers.

Figure 2A:
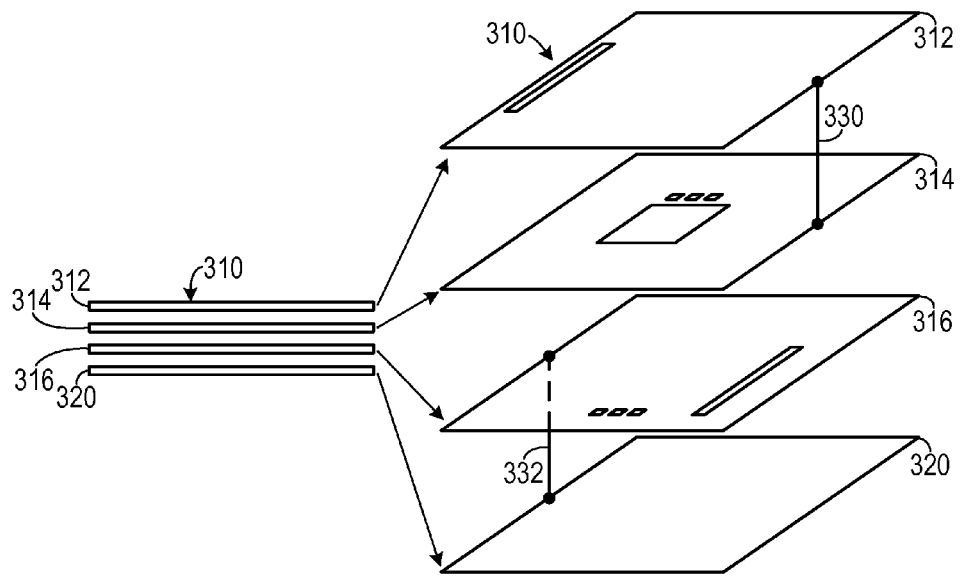
FIG. 2A is an expanded perspective view of three power planes and a ground plane.
Figure 2B:
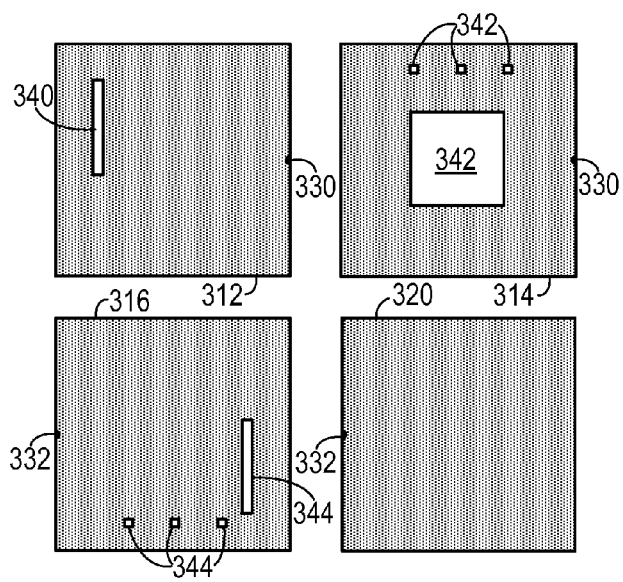
FIG. 2B is schematic view each of the planes shown in FIG. 2A.
Figure 3:
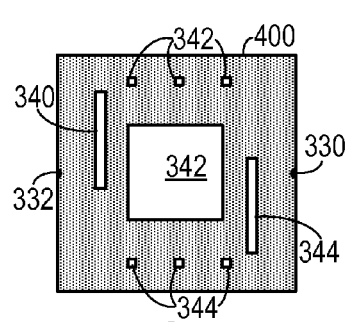
FIG. 3 is a schematic view of virtual plane onto which all of the features on the planes shown in FIGS. 3A-3B have been projected.

In one example shown in FIGS. 2A and 2B, a four-layer structure 310 includes four layers: a first metal layer 312, a second metal layer 314, a third metal layer 316 and a ground layer 320 (which is typically a metal layer). In this example, the first metal layer 312 includes an elongated aperture 340, the second metal layer 314 includes four square apertures 342, and the third layer includes four apertures 344 of different geometries. The first metal layer 314 is coupled to the second metal layer 330 by a common conductive port 330 and the third metal layer 316 is coupled to the ground layer 320 with a second conductive port 332. As shown in FIG. 3, all of the features on these layers can be projected onto a two dimensional shape 400 (also referred to as a "single planar construct"), that includes the outlines of all of the apertures and ports in the four layers 312, 314, 316 and 320.

Figure 4:
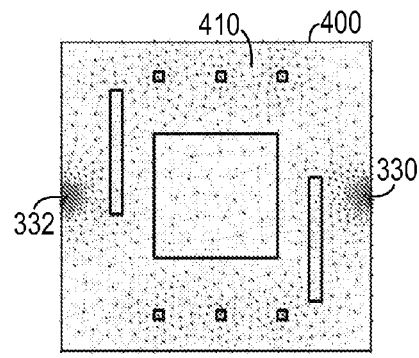
FIG. 4 is a triangular mesh that is laid over the virtual plane shown in FIG. 3.

As shown in FIG. 4, a triangular mesh 410 can then be applied to the planar construct 400 in which the nodes on the mesh tend to be denser around the nodes 330 and 332 and less dense in the void spaces of the apertures. This mesh can describe the geometrical features (polygon vertices and edges) in any of the layers. Generally, in the mesh, the nodes are relatively less dense in areas of the planar construct that are relatively more homogeneous electrically and are relatively more dense in areas of the planar construct that are relatively less homogeneous electrically. While use of a triangular mesh is disclosed in one example above, other types of polygonal meshes (e.g., rectangular) could be employed. In one embodiment, it is possible to combine elements of a triangular mesh with elements of a mesh including non-triangular polygons. In one embodiment, the triangular mesh is a Delaunay mesh.

For a multiple plane-pair structure containing more than two layers, it is possible to construct an equivalent circuit for each plane-pair. However, the equivalent circuits of different plane pairs assign their respective ground reference node to different layers. Therefore, to obtain a model for the multi-layered plane requires shifting the different reference nodes to one common ground.

Figure 5A:
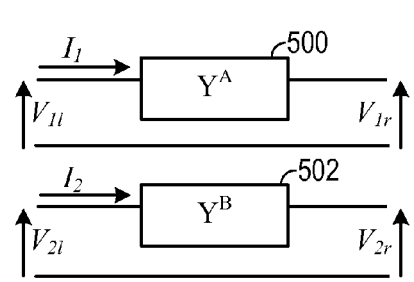
FIG. 5A is a schematic diagram showing two two-port networks with separate reference voltages.

This shifting of ground reference nodes can be done using indefinite admittance matrices. This is illustrated, without loss of generality, by using two-port networks 500 and 502 with separate ground references, as shown in FIG. 5A. The four-port admittance matrix for the system with the common reference node can be derived as follows:

$$Y_{11}^A V_{1l} + Y_{12}^A V_{1r} = I_1 \quad (169)$$

$$Y_{11}^B V_{2l} + Y_{12}^B V_{2r} = I_2 \quad (170)$$

Figure 5B:
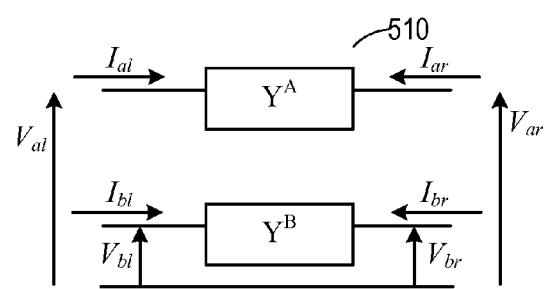
FIG. 5B is a schematic diagram of a combined four-port network with a common reference.

By noticing that $$I_{bl} = I_2 - I_1, I_{al} = I_1,$$

$$V_{1l} = V_{al} - V_{bl}, V_{1r} = V_{ar} - V_{br},$$

$$V_{2l} = V_{bl} \text{ and } V_{2r} = V_{br},$$

it is possible to write one row of the admittance matrix of a combined four-port network 510, as shown in FIG. 5B.

$$Y_{11}^A(V_{al} - V_{bl}) + Y_{12}^A(V_{ar} - V_{br}) = I_{al} \quad (171)$$

A similar approach can be used to obtain the complete system in the following form:

$$\begin{pmatrix} Y^A & -Y^A \\ -Y^A & Y^A + Y^B \end{pmatrix} \begin{pmatrix} V_{al} \\ V_{ar} \\ V_{bl} \\ V_{br} \end{pmatrix} = \begin{pmatrix} I_{al} \\ I_{ar} \\ I_{bl} \\ I_{br} \end{pmatrix} \quad (172)$$

For an M+1-layer (M plane-pair) package with solid power/ground planes on each layer, the system matrix, $\overline{Y}$, is obtained as a simple extension of Equation 172.

$$\overline{Y} = \begin{pmatrix} \overline{Y_1} & -\overline{Y_1} & & & \\ -\overline{Y_1} & \overline{Y_1} + \overline{Y_2} & -\overline{Y_2} & & \\ & \ddots & \ddots & \ddots & \\ & & & & -\overline{Y_{M-1}} \\ & & & -\overline{Y_{M-1}} & \overline{Y_{M-1}} + \overline{Y_M} \end{pmatrix} \quad (173)$$

where $\overline{Y_i}$, i=1, 2, . . . , M are admittance matrices obtained for the ith plane-pair counting from the top of the stack. The resulting matrix equation includes each discrete term in an arrangement corresponding to a spatial arrangement of each of the nodes. Solution of these matrices can be performed, for example, by using a numerical computing environment such as MATLAB, running on an appropriate digital computer.

Without apertures, the problem domain is simply a rectangle. In a more complex case with apertures, the flattened problem domain can be decomposed into a number of sub-domains, containing the solid metal planes and the apertures. To further explain this concept, an M+1-layer package with an arbitrary number of apertures on each layer can be flattened into a rectangular problem domain containing N sub-domains. Each of these sub-domains represents one aperture or many overlapping apertures. Thus, while adding the contributions of each layer i, i=1; 2, . . . , M, to the admittance matrix, the following cases are considered. As before, i=1 is the top-most layer. 1. Sub-domains $j_1, j_2, \ldots, j_P$ correspond to no apertures on layers i and i+1: This case is handled as in the previous sub-section. The contributions of the sub-domains $j_1, j_2, \ldots, j_P$ are added to Yi without alteration. 2. Sub-domains $k_1, k_2, \ldots, k_Q$ correspond to apertures on layer i: The contributions of sub-domains $k_1, k_2, \ldots, k_Q$ are removed from Yi. 3. Sub-domains $l_1, l_2, \ldots, l_R$ correspond to apertures on layers i+1, i+2, . . . , i+X: The contributions of sub-domains $l_1, l_2, \ldots, l_R$ are removed from $\overline{Y_i}$. Create admittance matrix M containing the contributions of the excluded sub-domains, with reference to corresponding nodes in layer X+1.

Figure 6:
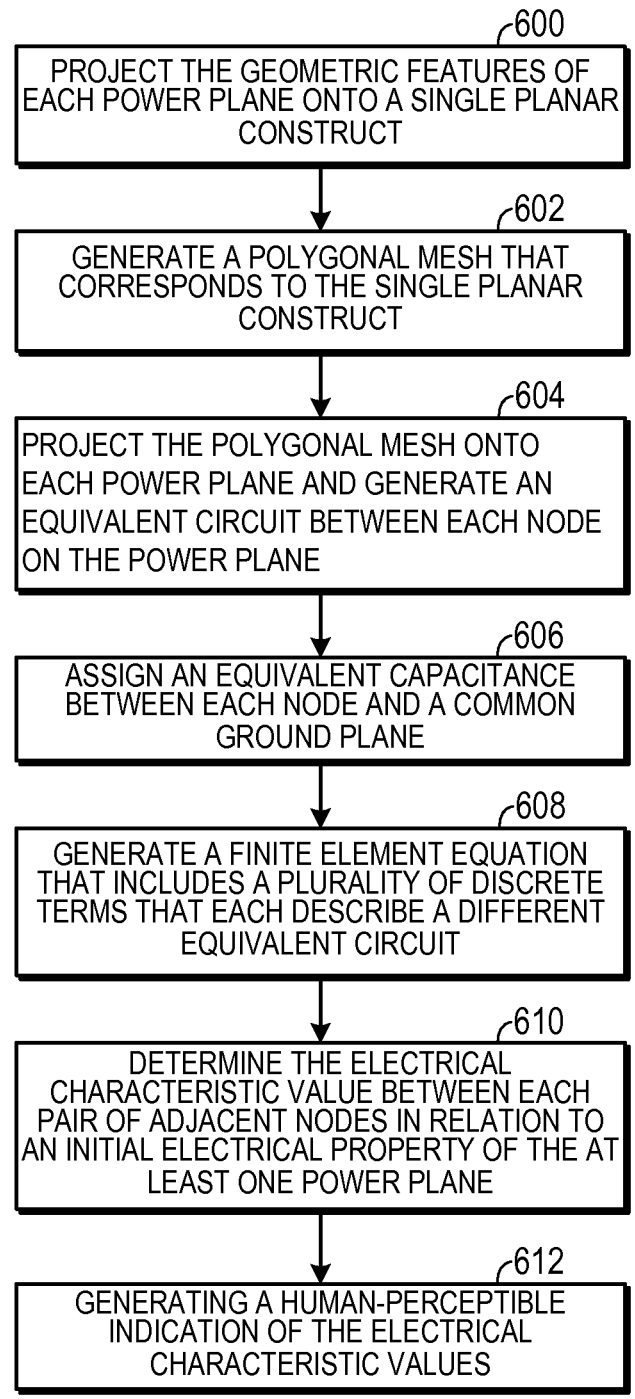
FIG. 6 is a flow chart showing one method of simulating the electrical characteristics of power planes and ground planes.

One method of performing simulations, according to the invention is shown in FIG. 6. This method is performed on a digital computer running a suitable numerical calculating environment, such as MATLAB. In the method, the geometric features of each power plane are projected 600 onto a single planar construct. A polygonal mesh is generated 602. The polygonal mesh includes a plurality of pairs of interconnected nodes and corresponds to the single planar construct. The polygonal mesh is projected 604 onto each power plane and generating an equivalent circuit between each adjacent node of the plurality of interconnected nodes projected onto each power plane. Thus, a plurality of equivalent circuits is generated. Each of the plurality of equivalent circuits describes an electrical characteristic of the at least one power plane in a region between each pair of adjacent nodes. An equivalent capacitance is assigned 606 between each node and a common ground plane. A finite element equation that includes a plurality of discrete terms is executed 608. In one example, the finite element equation can be solved by approximating a Helmholtz equation solution using commonly available numerical analysis tools. Each discrete term describes a different one of the plurality of equivalent circuits. The equation is solved and the electrical characteristic value between each pair of adjacent nodes in relation to an initial electrical property of the at least one power plane is determined 610. A human-perceptible indication of the electrical characteristic value between each pair of adjacent nodes of the at least one power plane is generated 612.

In one example of an experiment to validate the above-described method, a test case employed a four-layer structure of the type described in FIGS. 2A-2B, 3 and 4, with plane dimensions of 100 mm×100 mm. The difference in dimensions of each aperture was maximized to emphasize the meshing scheme employed by MFEM. Hence, the largest aperture size was 40×40 mm and the smallest was 3×3 mm. The minimum aperture size was chosen such that it still influenced the response of the structure at the maximum simulation frequency of 1 GHz. Two ports are placed between the bottom plane (ground) and the second plane, and between the third plane and the top plane, respectively. The dielectric used was FR-4 with $\in_r$=4:4. The structure was simulated with MFEM, which has been implemented using MATLAB, and the results were compared with the results of a similar MFDM analysis and a commercial power integrity simulator. The commercial tool performs 2.5-D simulation using FEM. A summary of the results with timing information and implementation details can be seen in the following table:

| METHOD | Number of Unknowns | Time per node | Code Used | Speed Advantage Resulting from Invention |
|---|---|---|---|---|
| MFEM | 3,594 | 0.350 s | MATLAB | — |
| MFDM | 122,411 | 5.6 s | C++ | 16 X |
| Commercial Tool | 71,204 | 2.0 s | Proprietary | 5.5 X |

The above-disclosed method, MFEM, preserves several advantages of M-FDM. These include a system that is sparse and a mesh that is applied only to the metal surfaces. Initial simulation results have demonstrated that MFEM requires significantly fewer unknowns while still providing accuracy comparable with other simulation methods. In the simulated examples, the MFEM problem size is roughly in the thousands of unknowns, whereas the number of unknowns in M-FDM was in the hundreds of thousands. This represents a reduction of around two orders of magnitude. MFEM has the potential to solve extremely large problems. Assuming that a maximum problem size of 500,000 unknowns (½ of M-FDM) can be solved using MFEM implemented with a direct solver, MFEM is capable of solving 50-500 layers. This is based on the assumption that each layer requires between 1,000 and 10,000 unknowns to discretize. A promising application of MFEM is in the simulation of multi-scale geometries or in the combined simulation of package and board.

Figure 7A:
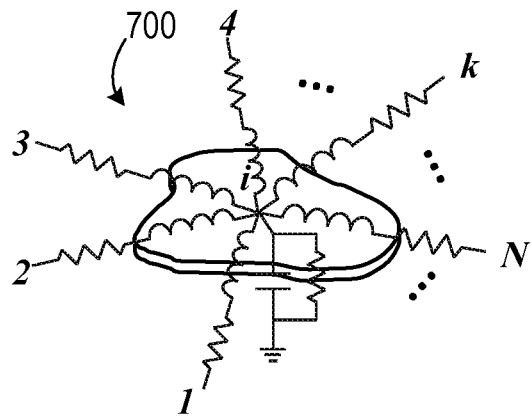
FIG. 7A is a schematic diagram showing equivalent circuit elements associated with an arbitrary area of a power or ground plane.
Figure 7B:
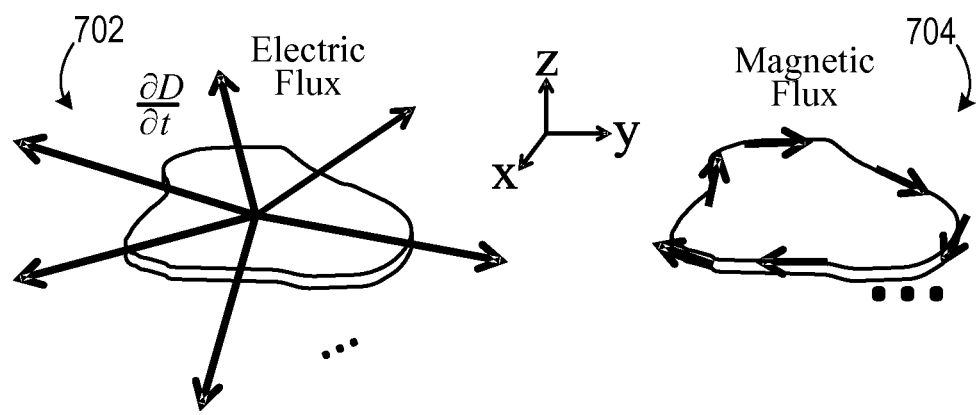
FIG. 7B is a schematic diagram representing electric flux and magnetic flux in an arbitrary area of a power or ground plane.
Figure 7C:
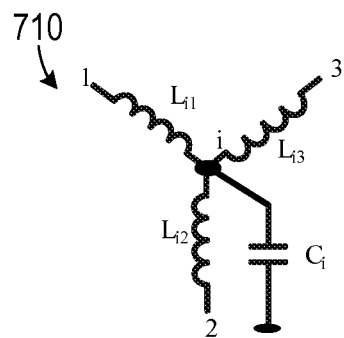
FIG. 7C is a schematic diagram on one an equivalent circuit showing inductances in an arbitrary area of a power or ground plane.

Two Models: Equivalent Circuit and Electromagnetic Representation: In another embodiment, a circuit board can be simulated using a Delaunay triangular meshing algorithm in concert with a Voronoi diagram. Since the thickness of typical power/ground planes is electrically very small, the electric field along the z-axis can be assumed as invariant. Hence, the equivalent circuit for power/ground planes can be approximated as a planar circuit. As shown in FIG. 7A, an example of power/ground planes with arbitrary shape 700 is shown with its equivalent circuit, which is composed of lumped circuit elements. The circuit model can be described by Kirchhoff's Circuit Law (KCL):

$$(j\omega C_i + G_i)V_i + \sum_{k=1}^{N} \frac{V_i - V_k}{j\omega L_{ik} + R_{ik}} = 0 \quad (1)$$

From the viewpoint of electromagnetics, the electric flux leaving or entering the given structure 702 can be assumed that it exists only on x-y plane as shown in 7B. According to Maxwell-Ampere's circuital law (Equation (2)), the time-varying electric field will produce a magnetic field along the contour 704 of the given structure, which gives rise to the following equation:

$$\nabla \times \vec{H} = \vec{J} + j\omega \epsilon \vec{E} \quad (2)$$

The voltage solution of the given structure, Vi, can be obtained by using an analogy between the equations (1) and (2).

Figure 8A:
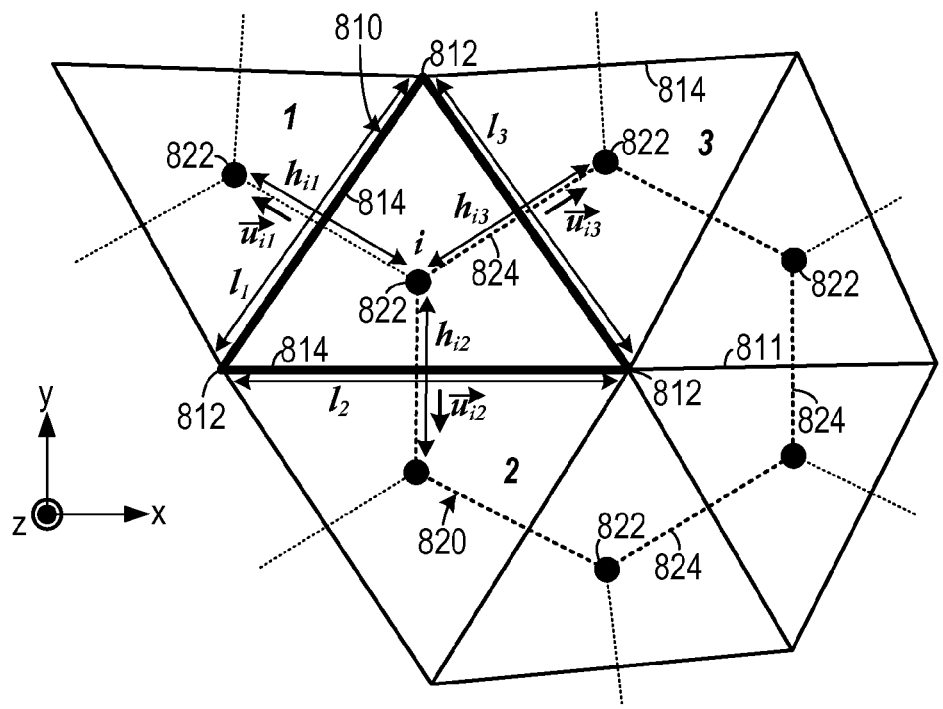
FIG. 8A is a schematic diagram a mesh that is projectable onto a portion of a power or ground plane.
Figure 8B:
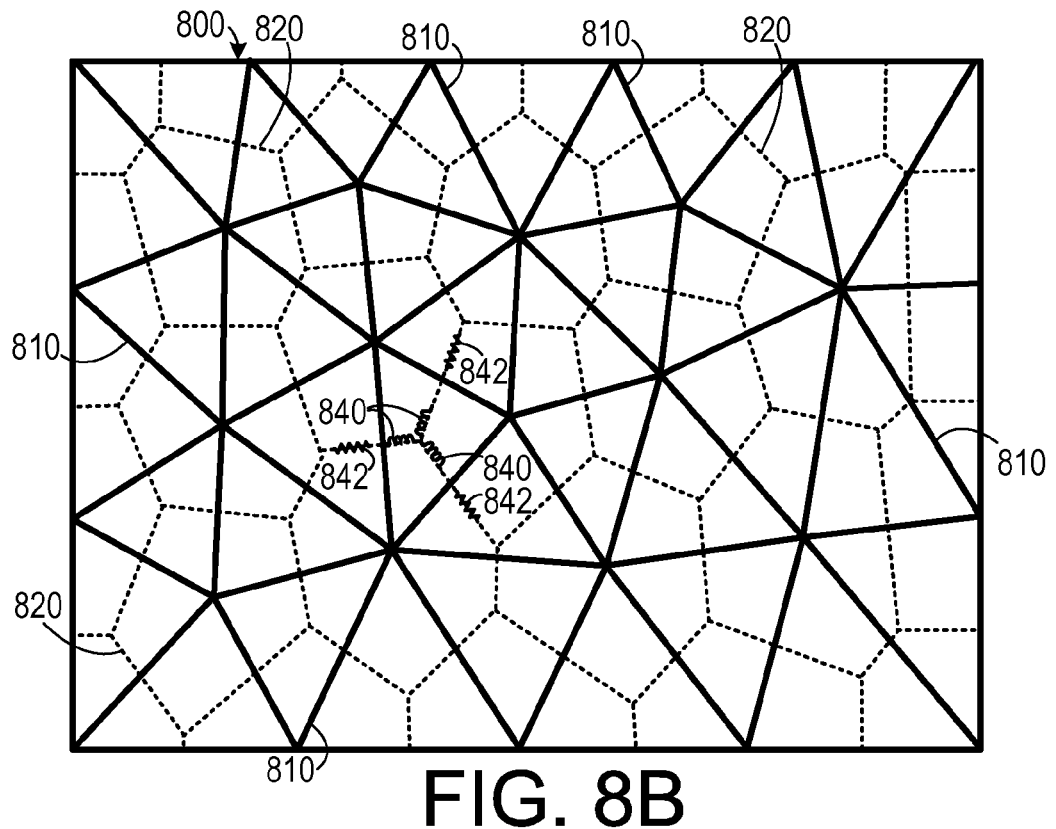
FIG. 8B is a schematic diagram a power or ground plane upon which a mesh has been projected.

Mesh and Formulation:

As shown in FIGS. 8A and 8B, a power plane model 800 can include a triangular mesh 810 that is built based on Delaunay triangulation. It has an important property that it has a dual graph, Voronoi diagram 820, which intersects the edges of the meshed triangles orthogonally. This property of the mesh geometry is important in the sense that electric and magnetic fields are orthogonal to each other. Hence, the concept of Maxwell-Ampere's circuital law (Equation (2)) can be applied to the triangular mesh with the dual graph. In this model, the Delaunay triangulation gives rise to a triangular mesh 810 that includes a plurality of triangles, each including three nodes 812 that connect three sides 814, wherein each side is common to exactly two different triangles. The Voronoi diagram 820 includes a plurality of Voronoi cells, each including a plurality of vertices 822 that interconnect a plurality of edges 824. Each edge 824 is orthogonal to exactly one side 814. Each edge includes an equivalent inductance 840 and an equivalent resistance 842.

To apply Maxwell-Ampere's circuital law to a finite object, it is convenient to use an integral form, as follows:

$$\oint_C \vec{H} \cdot \vec{dl} = \iint_S (\vec{J} + j\omega \epsilon \vec{E}) \cdot \vec{ds} \quad (3)$$

where C and S are the contour and surface of the unit triangle, respectively. The E- and H-fields can be represented by two-dimensional voltage distribution, V(x,y), $$\vec{E} = -\hat{z}\frac{V(x, y)}{d} \quad (4)$$

$$\vec{H} = -\frac{1}{j\omega\mu d}(\nabla V(x, y) \times \hat{z}) \cdot \vec{dl} \quad (5)$$

where d is the dielectric thickness. The gradient of V(x,y) can be approximated as a linear voltage difference between the unit triangle and the neighboring triangles. Therefore, the left-hand side of Equation (3) is derived as follows:

$$\oint_C \vec{H} \cdot \vec{dl} = -\frac{1}{j\omega\mu d}\oint_C (\nabla V(x, y) \times \hat{z}) \cdot \vec{dl} \quad (6)$$
$$= -\frac{1}{j\omega\mu d}\oint_C \nabla V(x, y) \cdot (\hat{z} \times \vec{dl})$$
$$= -\frac{1}{j\omega\mu d}\sum_{k=1}^{3}\left(\frac{V_i - V_k}{h_{ik}}\right)\vec{u}_{ik} \cdot (\vec{u}_{ik} l_k)$$
$$= -\frac{1}{j\omega\mu d}\sum_{k=1}^{3}\left\{(V_i - V_k)\frac{l_k}{h_{ik}}\right\}.$$

The unit triangle has only three neighboring nodes that are subject to calculation. Because of the nature of Delaunay triangulation, each polygon will typically face about six neighboring nodes that are subject to calculation, as a result of which the system matrix can be dense.

In the right-hand side of Equation (2), current density, J, is the density of conduction current, whose field meets the integral path orthogonally. Thus, taking surface integral of the equation eliminates the J-term. Moreover, when the size of the unit triangle is electrically small enough, the electric potential can be assumed to be uniform. Therefore, the equation can be derived as follows:

$$\iint_S (\vec{J} + j\omega\epsilon\vec{E}) \cdot \vec{ds} = j\omega\epsilon\iint_S \frac{V_i}{d} \cdot \vec{ds} \quad (7)$$
$$= j\omega\epsilon\frac{V_i}{d}A_i$$

where $A_i$, is the area of the unit triangle.

Finally, the values of the lumped elements in the equivalent circuit can be obtained by merging Equations (6) and (7) into Equation (1):

$$C_i = \epsilon \frac{A_i}{d} \quad (8)$$

$$L_{ik} = \mu d \frac{h_{ik}}{l_k}$$

For clarity, loss terms are not included for though their incorporation is straightforward and readily known to those of skill in the art.

Modeling of Multiple Plane-Pairs

Shifting of Reference Nodes:

Multiple plane-pairs can be simulated as a set of single plane-pairs. The equivalent circuits for each single plane-pair can be obtained by the procedure explained above. However, the equivalent circuits for different plane pairs do not reference to the same layer. Therefore, stacking the each equivalent circuits on top of each other without modifying its reference node will result in an incorrect modeling.

Figure 9A:
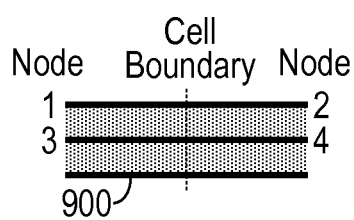
FIG. 9A is a schematic representation of a cross-section of a three-layer structure.
Figure 9B:
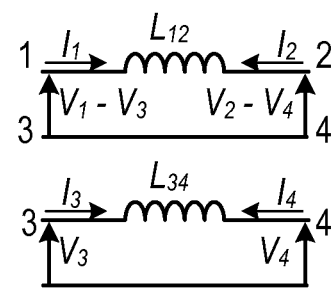
FIG. 9B is a schematic representation of an inductance model.
Figure 9C:
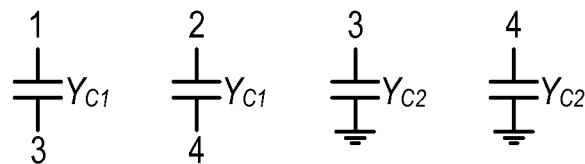
FIG. 9C is a schematic representation of a capacitance model.

One way to correctly model multiple plane-pairs is to shift reference nodes using indefinite admittance matrix. The basis for this modeling is shown in FIGS. 9A-9C. A three plane structure 900 is shown in FIG. 9A. This three-layered structure 900 can be decomposed into two single plane-pairs as shown in FIG. 9B. The inductance and capacitance models are shown in FIGS. 9B and 9C. $L_{12}$ and $L_{34}$ are per unit cell inductances for each plane pair that can be obtained from Equation (8). Assuming the plane 3 is the common ground, the indefinite admittance matrices for the top and bottom plane-pairs can be derived as follows:

$$\begin{bmatrix} I_1 \\ I_2 \\ I_3 \\ I_4 \end{bmatrix} = \begin{bmatrix} Y_1 & -Y_1 & -Y_1 & Y_1 \\ -Y_1 & Y_1 & Y_1 & -Y_1 \\ -Y_1 & Y_1 & Y_1 & -Y_1 \\ Y_1 & -Y_1 & -Y_1 & Y_1 \end{bmatrix} \begin{bmatrix} V_1 \\ V_2 \\ V_3 \\ V_4 \end{bmatrix} \quad (9)$$

$$\begin{bmatrix} I_3 \\ I_4 \end{bmatrix} = \begin{bmatrix} Y_2 & -Y_2 \\ -Y_2 & Y_2 \end{bmatrix} \begin{bmatrix} V_3 \\ V_4 \end{bmatrix} \quad (10)$$

where $$Y_1 = \frac{1}{j\omega L_{12}}$$

and $$Y_2 = \frac{1}{j\omega L_{34}} \quad (11)$$

Similarily, an admittance matrix for capacitance between plane-pairs is obtained as follows:

$$\begin{bmatrix} I_1 \\ I_2 \\ I_3 \\ I_4 \end{bmatrix} = \begin{bmatrix} Y_{C1} & 0 & -Y_{C1} & 0 \\ 0 & Y_{C1} & 0 & -Y_{C1} \\ -Y_{C1} & 0 & Y_{C1}+Y_{C2} & 0 \\ 0 & -Y_{C1} & 0 & Y_{C1}+Y_{C2} \end{bmatrix} \begin{bmatrix} V_1 \\ V_2 \\ V_3 \\ V_4 \end{bmatrix} \quad (12)$$

where $$Y_{C1} = j\omega C_1$$

and $$Y_{C2} = j\omega C_2 \quad (13)$$

Loss terms are omitted in both models for simplification.

Finally, interposing all the indefinite admittance matrices, Equation (9), (10), and (12), completes the total admittance matrix for the given three-layered structure:

$$\begin{bmatrix} Y_{C1}+Y_1 & -Y_1 & -Y_{C1}-Y_1 & Y_1 \\ -Y_1 & Y_{C1}+Y_1 & Y_1 & -Y_{C1}-Y_1 \\ -Y_{C1}-Y_1 & Y_1 & Y_{C1}+Y_{C2}+Y_1+Y_2 & -Y_1-Y_2 \\ Y_1 & -Y_{C1}-Y_1 & -Y_1-Y_2 & Y_{C1}+Y_{C2}+Y_1+Y_2 \end{bmatrix} \quad (14)$$

Since the total admittance matrix is a sparse matrix, a direct linear equation solver can effectively solve the problem. For example, using nested dissection method [8], the computation time for the matrix of size N×N can be achieved to $O(N^{1.5})$, and required storage can be $O(0.5N \log_2 N)$, where N=kM, and k and M are the number of layers and unit triangles, respectively.

Meshing and Sub-Domains of Aperture:

To apply the indefinite admittance matrix method for multiple plane-pairs as described in the previous section, mesh nodes on each layer should be in the same (x, y)-location. This can be done by meshing a layer on which all the features from each layer are put together. The features can include any physical structures such as apertures and plane boundaries, which need to be meshed. Each feature is assigned to its unique sub-domain.

When a problem structure contains apertures, the node within a sub-domain of apertures needs to be considered in a different way. If a calculation node is inside of a sub-domain of a plain-conductor, the values of lumped elements connected to the node can be directly obtained by Equation (8). However, if a calculation node is inside of a sub-domain of an aperture, it should be treated with three different cases:

(1) Apertures are neither on the current layer nor on the layer below: The node calculation is executed equivalently when the node is in the sub-domain of a plain conductor.

(2) The node and an aperture are on the same layer: Since the node has no contribution to the system, no calculation is conducted.

(3) An aperture or apertures are on the layer(s) below (consecutively): modifications of permittivity ($\in_r$), permeability ($\mu_r$), dielectric thickness of Equation (8), and the reference node are required.

Figure 10A:
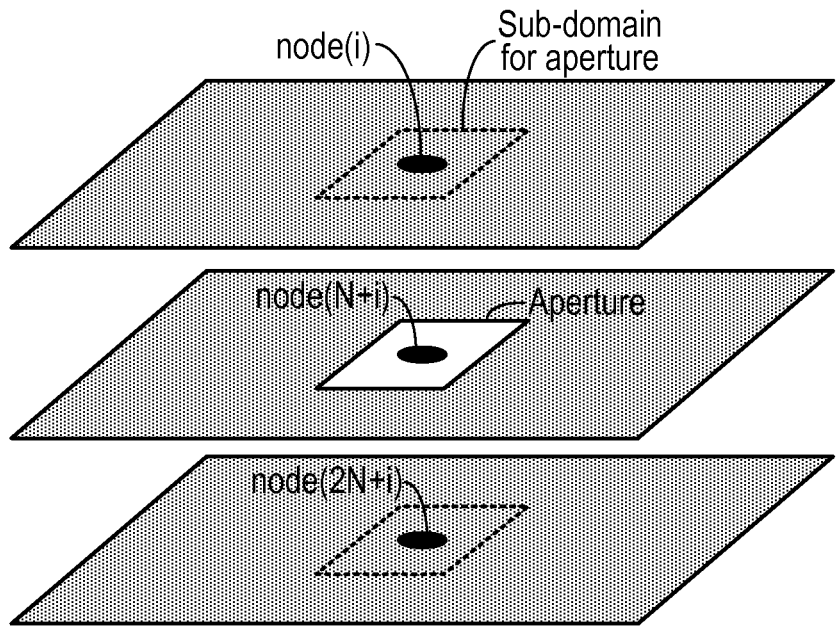
FIG. 10A is an exploded perspective view of a three-layer structure.
Figures 10B, 10C:
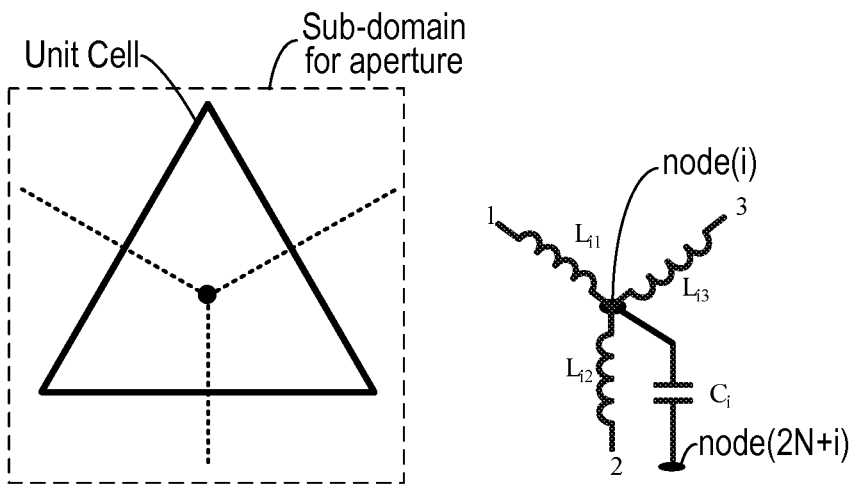
FIG. 10B is a schematic representation of a unit cell based on the structure shown in FIG. 10A.
FIG. 10C is a schematic representation of an inductance circuit equivalent based on the unit cell shown in FIG. 10B.

To further explain case three, FIG. 10A shows a three-layer structure with an aperture in the middle layer. The equivalent circuit for m-th calculation node is shown in FIG. 10B. Since the conductor plane on the second layer is missing, the thickness of the dielectric between m-th node and (2N+m)-th node is $d_1+d_2$. If dielectric material is homogeneous on both layers, modified values of the lumped elements for the m-th node are, $$C_m = \epsilon \frac{A_m}{d_1+d_2} \quad (15)$$

$$L_{mk} = \mu(d_1+d_2)\frac{h_{mk}}{l_k}$$

where k=1, 2, and 3, representing the indices of neighboring nodes. An equivalent circuit for node (i) is shown in FIG. 10C.

Since a conductor is missing on (m+N)-th node on the second layer, the reference node of the m-th node has to be shifted to (m+2N)-th node on the third layer, where N is the number of the nodes on a single plane-pair. Shifting reference node is done using an indefinite admittance matrix, $$\begin{array}{c} m^{th} \\ (2N+m)^{th} \end{array} \begin{bmatrix} \ddots & & & \\ & Y_{Cm} & \cdots & -Y_{Cm} & \\ & \vdots & \ddots & \vdots & \\ & -Y_{Cm} & \cdots & Y_{Cm} & \\ & & & & \ddots \end{bmatrix} \quad (16)$$

where $$Y_{Cm} = j\omega C_m \quad (17)$$

Inclusion of Decoupling Capacitors and Vias: The addition of a decoupling capacitor to the power/ground plane model can be conducted in the concept of equivalent circuit. The equivalent circuit for a typical decoupling-capacitor can be modeled connecting capacitors, equivalent series inductance (ESL), and resistance (ESR) in series. With the values of the circuit elements, the two-port admittance matrix for the decoupling-capacitor network can be created. Finally, the two-port admittance matrix is stamped on to the admittance matrix of the power/ground plane in accordance with the node connectivity as similarly done in Equation (16). For example, if a decoupling capacitor is connected between node-n on the upper plane and node-(n+N) on the lower plane, the admittance matrix of the decoupling-capacitor network (Y is added to the power/ground system as follows:

$$\begin{array}{c} n^{th} \\ (n+N)^{th} \end{array} \begin{bmatrix} \ddots & & & \\ & Y_{decap} & \cdots & -Y_{decap} & \\ & \vdots & \ddots & \vdots & \\ & -Y_{decap} & \cdots & Y_{decap} & \\ & & & & \ddots \end{bmatrix} \quad (18)$$

To compare memory requirements, and to provide the validity of the Multi-layer Triangular Element Method (MTEM) disclosed herein, the first example is a simple single plane-pair with rectangular planes. It consists of two solid metal planes and a dielectric layer between them. The metal planes are size of 40 mm×30 mm, and a 200 μm dielectric layer is placed between them. Dielectric constant of the dielectric is 4.5, and conductivity of the metal is 5.8×10⁷S/m. Two ports are located at (10, 15) mm and (20, 15) mm. For better comparison of the simulation accuracy, dielectric loss is ignored.

Since the structure is completely rectangular without an aperture, cavity resonator method can provide accurate impedance responses at the port locations. The structure was also simulated with MFDM and MFEM, as well as with MTEM.

Results from all of the four methods converge to the exact solution within a percent error of 0.04. With this accuracy, MTEM created the fewest non-zero elements in a system matrix. Fewer non-zeros in a matrix mean less memory is required for the matrix calculation. Note that the method in [3] uses the same mesh nodes as MFEM; triangle vortexes. In addition, a node in both methods is subject to account for the interactions between the neighboring nodes and itself. Hence, the number of unknowns and non-zeros are equivalent as MFEM for the same mesh. Memory comparison of MTEM and the other methods is summarized in Table 1:

TABLE I

COMPARISON OF MEMORY CONSUMPTION

| Method | Non-Zeros | Unknowns | Percent Error | Z21 at 1 GHz |
|---|---|---|---|---|
| Cavity Resonator | — | — | 0 | −j0.657609 |
| MTEM | 4,434 | 1,126 | 0.027 | −j0.657433 |
| MFEM | 7,925 | 1,153 | 0.037 | −j0.657854 |
| MFDM | 23,720 | 4,800 | 0.035 | −j0.657036 |

Figure 11A:
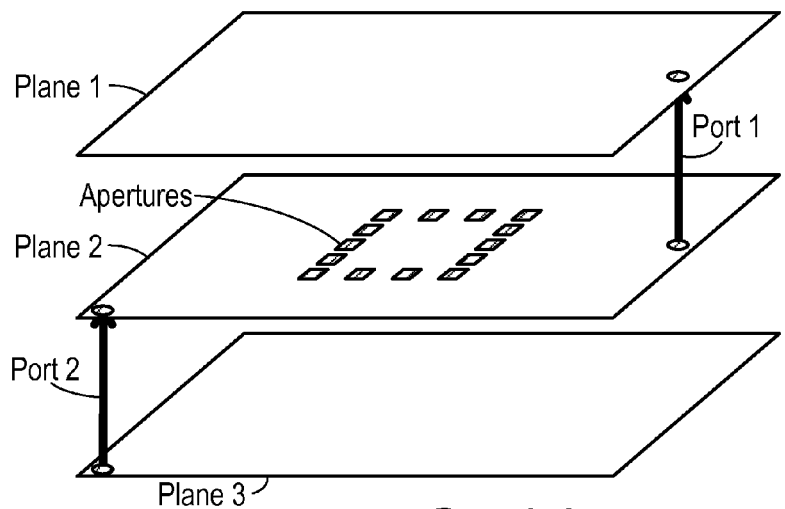
FIG. 11A is an exploded perspective view of a three-layer structure.
Figure 11B:
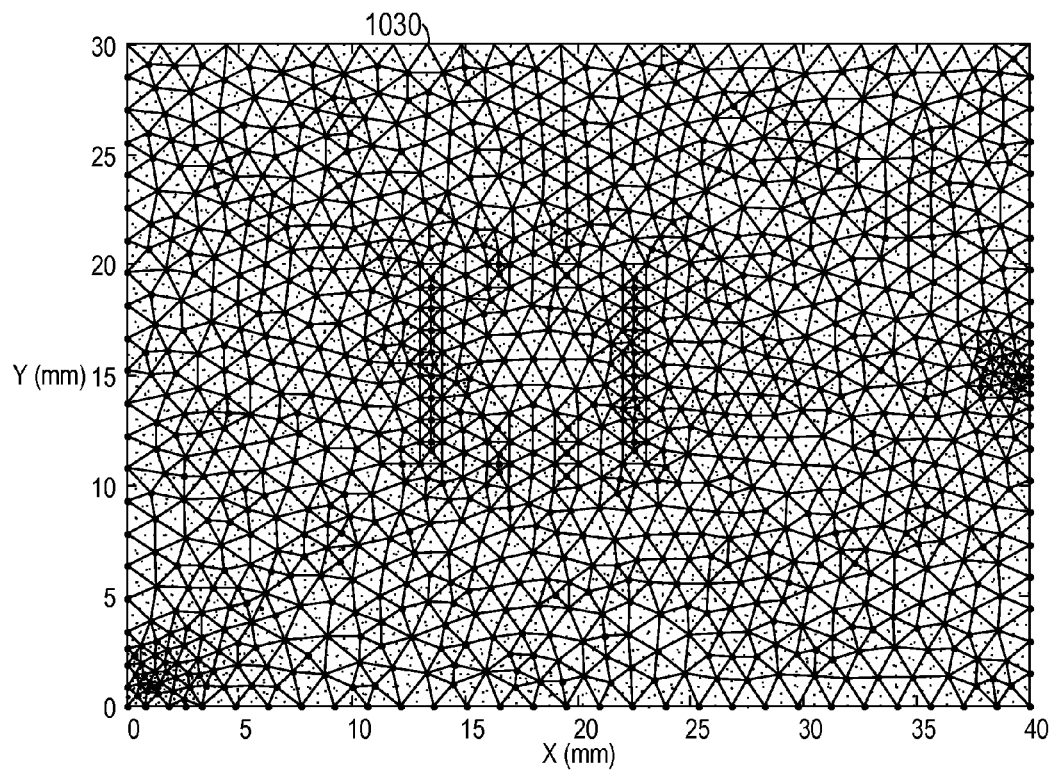
FIG. 11B is a plan view of a mesh corresponding to the three-layer structure shown in FIG. 11A.

To validate MTEM of handling more complex problems, a three-layer power/ground plane with small apertures in the middle layer is designed as shown in FIG. 11A. The dimensions of the conductor planes are 40 mm×30 mm, and the apertures are 1 mm×1 mm. Planes are separated by a dielectric layer whose thickness is 200 μm, with $\in_r$=4.5. Loss tangent of the dielectric is 0.02, and the conductivity of the metal is 5.8×10⁷S/m. Two ports are located at (1.25, 1.25) mm and (39.25, 15.25) mm, connecting plane layer 2 and 3, and 1 and 2, respectively. The corresponding meshes 1030 shown in FIG. 11B.

The simulation results from MFDM, MFEM, and MTEM agree well. A considerable amount of coupling was observed in the transfer impedance. This coupling was due to the presence of the small apertures in the middle layer, and the electromagnetic energy gets coupled through the holes. MTEM created a system matrix with 2,226 unknowns, which is smaller than that of MFEM (5,712) and MFDM (9,600). The number of nonzero elements for MTEM is also the smallest, which is about 17K, compared to MFEM (76K) and MFDM (94K).

Since this method uses a triangular mesh, multi-scale structures can be effectively discretized. To apply MTEM to multilayer structures, reference node for each plane pair is assigned to a common ground node, thus the coupling effect between the plane pairs are correctly considered.

Figure 12A:
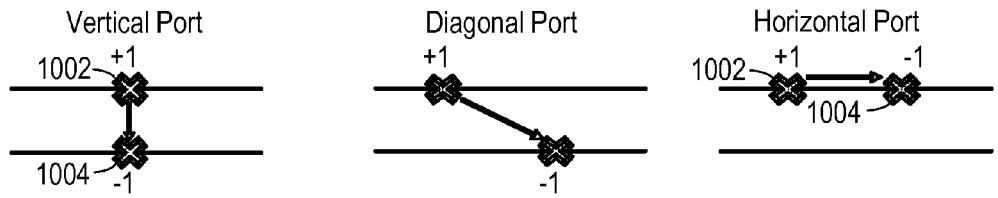
FIGS. 12A-12C are schematic views demonstrating a method of simulating electrical characteristics of non-vertical ports.

As shown in FIG. 12A, to excite a signal and observe the corresponding response, a port must be assigned at the desired location. A port basically consists of a positive (+) terminal 1002 and a negative (−) terminal 1004, and its response is the voltage difference between the (+) and (−) terminals. In simulation, a current is assigned to each terminal and it is assumed that the current going into the positive terminal is the same as the current leaving the negative terminal so, for example, the positive terminal 1002 could be assigned a current of +1 A and the negative terminal 1004 could be assigned a current of −1 A.

A vertical port has the terminals on different planes, but the terminals are vertically aligned. Some ports are not vertically aligned. For example, a horizontal port has both terminals on the same plane and a diagonal port has the positive terminal on a first plane and the negative terminal on another plane, but the terminals are not aligned vertically.

Figure 12B:
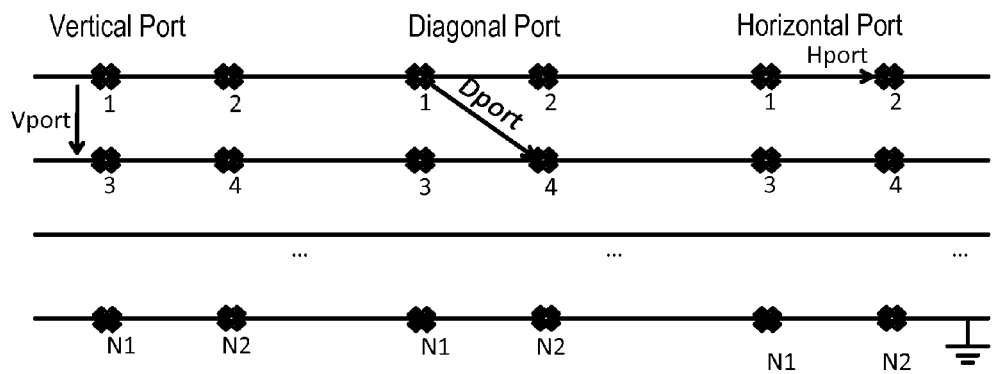

As shown in FIG. 12B, calculating the port voltage of a vertical port (Vport) is performed by subtracting the terminal voltage of the negative terminal (in this case terminal 3) from that of the positive terminal (terminal 1). Thus, Vport=V1−V3. Determining a diagonal port voltage (Dport) involves a couple of additional step. This is done by creating virtual terminals that are vertically aligned with the port terminals and projecting them onto a common reference layer. Then the voltages of the port terminals and the virtual terminals are determined with reference to a "dummy layer" that is generated by the system, but that is not physically present in the actual circuit board. The voltage difference between each port terminal and its corresponding vertically aligned virtual terminal is calculated and the resulting voltage difference corresponding to the negative terminal is subtracted from the resulting voltage difference corresponding to the positive terminal, thereby giving the port voltage. A similar process is performed to determine the port voltage of a horizontal port.

Figure 12C:
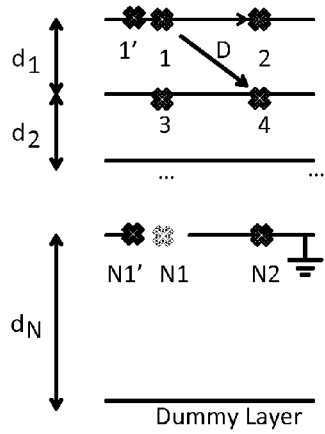

There are two ways to estimate the port voltage of a either a horizontal port or a diagonal port in which the projected reference node (or terminal) falls in an aperture or other void region, as shown in FIG. 12C. In one method, the voltage of the missing node is interpolated by multiplying the voltage of the positive port times the ratio of the distance between the reference node to the dummy layer over the distance of the positive terminal to the dummy layer. Thus VN1 can be determined using the following formula: $V(N1)=V(1)*(d_N/(d_1+d_2+ \ldots +d_N))$. When using this method, the virtual terminal voltage of the other terminals is also calculated according to the following formula: $V(N2)=V(2)*(d_N/(d_1+d_2+ \ldots +d_N))$. In an alternate method, the closest point that is on a metal plane is used in place of the original node. In the example given, the assumption that $V(N1) \approx V(N1')$ is used.

Circuits may be simulated using the multi-layer triangular element method (MTEM), one of the planar circuit modeling methods, and a 3D full-wave solver, CST Microwave Studio, which is based on the finite integration technique.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method, operable on a digital computer coupled to a user interface, of simulating electrical characteristics of a circuit board having a plurality of features, comprising the steps of:
   (a) projecting the plurality of features onto a planar construct;
   (b) executing on the digital computer a Delaunay triangulation routine for generating a triangular mesh that corresponds to the single planar construct, wherein the triangular mesh includes a plurality of triangles in which each triangle and three other triangles each share a common side;
   (c) executing on the digital computer a routine that generates a Voronoi diagram corresponding to the triangular mesh in which the Voronoi diagram comprises a plurality of cells that include a plurality of edges, each edge ending in a vertex, wherein exactly one vertex is disposed in each triangle in the triangular mesh;
   (d) determining an equivalent circuit for each triangle, the equivalent circuit including exactly three sub-circuits that couple a vertex within the triangle to a vertex within an adjacent triangle and exactly one sub-circuit that couples the vertex within the triangle to a reference plane;
   (e) executing on the digital computer a routine for solving, for each triangle, an equation describing an electrical characteristic value based on the equivalent circuit corresponding to the triangle; and
   (f) executing on the digital computer a routine for generating a human-perceptible indication of the electrical characteristic value for each triangle.

2. The method of claim 1, wherein the step of solving, for each triangle, an equation describing an electrical characteristic value based on the equivalent circuit corresponding to the triangle comprises the steps of:
   (a) projecting the triangular mesh and the Voronoi diagram onto a selected electrical plane in the circuit board;
   (b) simulating application of a predefined current to a selected port located on the selected electrical plane; and
   (c) calculating a voltage for at least one vertex on the Voronoi diagram projected onto the selected plane resulting from the predefined current.

3. The method of claim 1, wherein each edge of each cell is orthogonal to exactly one side of one a triangle.

4. The method of claim 1, wherein each of the three sub-circuits that couple a vertex within the triangle to a vertex within an adjacent triangle includes an inductive component and a resistive component.

5. The method of claim 1, wherein the sub-circuit that couples the vertex within the triangle to a reference plane includes a capacitive component and a resistive component.

6. The method of claim 1, wherein the Voronoi diagram has an increasing density of vertices in areas nearer to a feature and a decreasing density of vertices in areas farther from a feature.

7. The method of claim 1, wherein the plurality of features comprises at least one electronic component.

8. The method of claim 1, wherein the plurality of features comprises at least one aperture.

9. The method of claim 1, wherein the plurality of features comprises at least one port.

10. The method of claim 1, wherein the circuit board includes at least a first conductive plane and a second conductive plane and wherein the selected port comprises a non-vertical port including a first terminal and a spaced apart second terminal that is disposed in a non-vertical relationship to the first terminal, the first terminal disposed on the first conductive plane and the second terminal disposed on a selected one of the first conductive plane and the spaced apart second conductive plane, by instructing the digital computer to execute a set of steps, comprising:
   (a) generating a simulated representation of the first conductive plane, the first terminal and the second terminal;
   (b) generating a simulated reference plane disposed apart from a conductive plane on which the second terminal is disposed;
   (c) calculating a first voltage difference between the first terminal and a first virtual terminal disposed on the second conductive plane, wherein the first virtual terminal is in vertical alignment with the first terminal;
   (d) calculating a second voltage difference between the first virtual terminal and the reference plane;
   (e) subtracting the second voltage difference from the first voltage difference, thereby generating a first terminal voltage;
   (f) when the second terminal is horizontally disposed from the first terminal and dispose on the first conductive plane, then:
      (i) calculating a third voltage difference between the second terminal and a second virtual terminal disposed on the second conductive plane, wherein the second virtual terminal is in vertical alignment with the second terminal;
      (ii) calculating a fourth voltage difference between the second virtual terminal and the reference plane;
      (iii) subtracting the fourth voltage difference from the third voltage difference, thereby generating a second terminal voltage;

(g) when the second terminal is horizontally disposed from the first terminal and dispose on the second conductive plane, then:
  (i) calculating a third voltage difference between the second terminal and a second virtual terminal disposed on the first conductive plane, wherein the second virtual terminal is in vertical alignment with the second terminal;
  (ii) calculating a fourth voltage difference between the second virtual terminal and the reference plane;
  (iii) subtracting the fourth voltage difference from the third voltage difference, thereby generating a second terminal voltage;
(h) subtracting the second terminal voltage from the first terminal voltage, thereby determining a port voltage.

11. The method of claim 10, further comprising the step of interpolating a voltage of the second virtual terminal when the second virtual terminal is disposed in an aperture by approximating the second virtual terminal voltage based on a voltage of a point that is adjacent to the aperture and that is disposed on a conductive surface.

12. A method, operable on a digital computer coupled to a user interface, of simulating electrical characteristics of a circuit board having a plurality of features, comprising the steps of:
(a) projecting the plurality of features onto a planar construct;
(b) executing on the digital computer a Delaunay triangulation routine for generating a triangular mesh that corresponds to the single planar construct, wherein the triangular mesh includes a plurality of triangles in which each triangle and three other triangles each share a common side;
(c) executing on the digital computer a routine that generates a Voronoi diagram corresponding to the triangular mesh in which the Voronoi diagram comprises a plurality of cells that include a plurality of edges, each edge ending in a vertex, wherein exactly one vertex is disposed in each triangle in the triangular mesh and wherein each edge of each cell is orthogonal to exactly one side of one a triangle, the Voronoi diagram having an increasing density of vertices in areas nearer to a feature and a decreasing density of vertices in areas farther from a feature;
(d) determining an equivalent circuit for each triangle, the equivalent circuit including exactly three sub-circuits that couple a vertex within the triangle to a vertex within an adjacent triangle and exactly one sub-circuit that couples the vertex within the triangle to a reference plane;
(e) projecting the triangular mesh and the Voronoi diagram onto a selected electrical plane in the circuit board;
(f) simulating application of a predefined current to a selected port located on the selected electrical plane;
(g) calculating a voltage for at least one vertex on the Voronoi diagram projected onto the selected plane resulting from the predefined current; and
(h) executing on the digital computer a routine for generating a human-perceptible indication of the electrical characteristic value for each triangle.

13. The method of claim 12, wherein each of the three sub-circuits that couple a vertex within the triangle to a vertex within an adjacent triangle includes an inductive component and a resistive component and wherein the sub-circuit that couples the vertex within the triangle to a reference plane includes a capacitive component and a resistive component.

14. The method of claim 12, wherein the circuit board includes at least a first conductive plane and a second conductive plane and wherein the selected port is a non-vertical port, including a first terminal and a spaced apart second terminal that is disposed in a non-vertical relationship to the first terminal, the first terminal disposed on the first conductive plane and the second terminal disposed on a selected one of the first conductive plane and the spaced apart second conductive plane, by instructing the digital computer to execute a set of steps, comprising:
(a) generating a simulated representation of the first conductive plane, the first terminal and the second terminal;
(b) generating a simulated reference plane disposed apart from a conductive plane on which the second terminal is disposed;
(c) calculating a first voltage difference between the first terminal and a common dummy plane;
(d) calculating a second voltage difference between a first virtual terminal and the common dummy plane, wherein the first virtual terminal is vertically aligned with the first terminal and is disposed on a reference plane;
(e) subtracting the second voltage difference from the first voltage difference, thereby generating a first terminal voltage;
(f) calculating a third voltage difference between the second terminal and the common dummy plane;
(g) calculating a fourth voltage difference between a second virtual terminal and the common dummy plane, wherein the second virtual terminal is vertically aligned with the second terminal and is disposed on the reference plane;
(h) subtracting the fourth voltage difference from the third voltage difference, thereby generating a second terminal voltage;
(i) subtracting the second terminal voltage from the first terminal voltage, thereby determining a port voltage.

15. The method of claim 14, further comprising the step of interpolating a voltage of the second virtual terminal when the second virtual terminal is disposed in an aperture by approximating the second virtual terminal voltage as being equal to the first terminal voltage times a ratio of $(d2/(d1+d2))$, where d2 equals a distance between the second virtual terminal and the reference plane and d1 equals a distance between the first terminal and a plane on which the second virtual terminal is disposed.

16. The method of claim 12, wherein the plurality of features comprises at least one feature selected from a list consisting of: an electronic component, an aperture, and a port.

* * * * *